Figure 1:
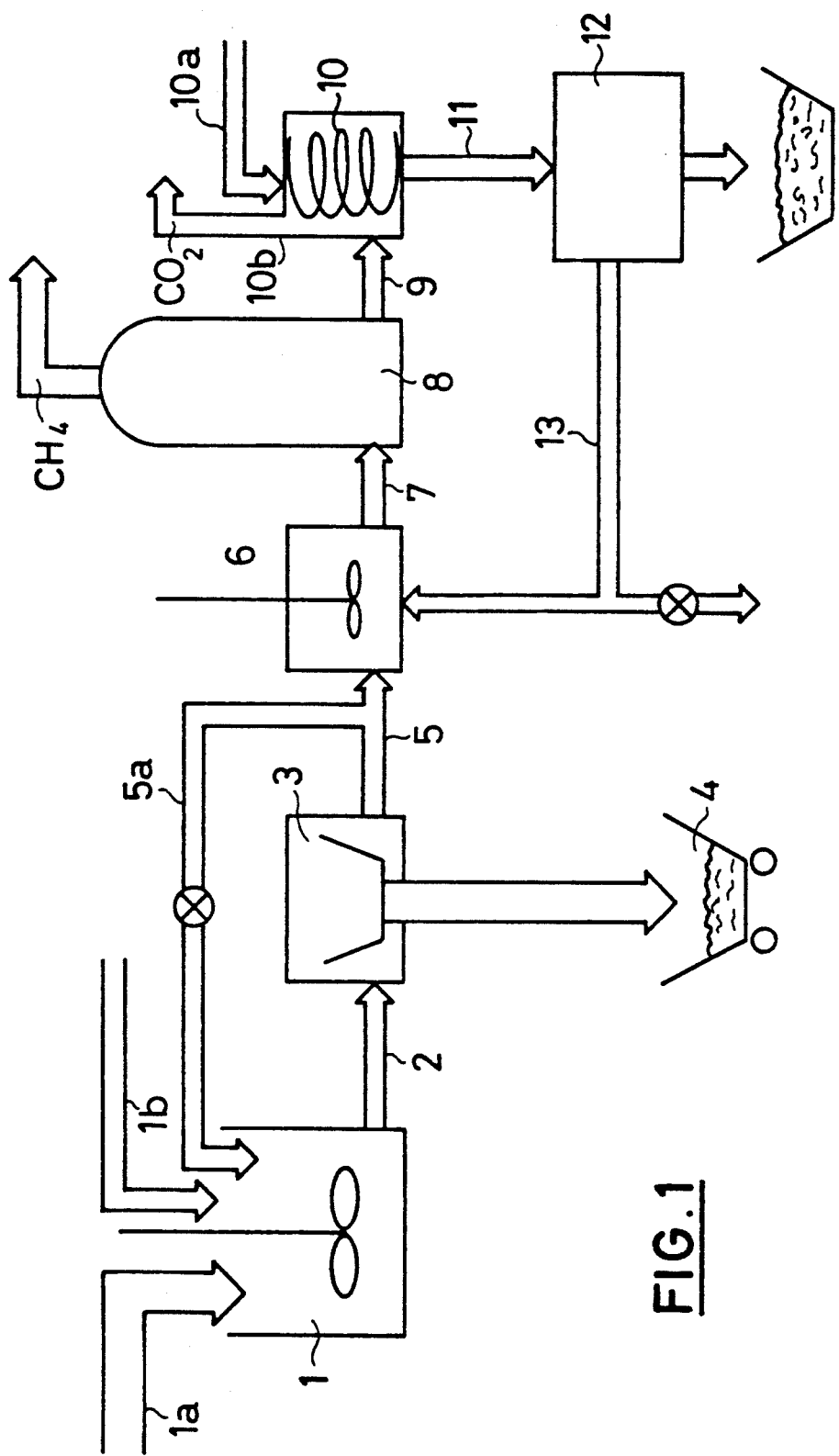

United States Patent [19]

Gass

[11] Patent Number: 5,317,043

[45] Date of Patent: May 31, 1994

[54] PROCESS FOR THE RECOVERY OF POLYMERS DISSOLVABLE IN AQUEOUS ALKALINE OR ACID MEDIA

[75] Inventor: Michael Gass, Olten, Switzerland

[73] Assignee: Belland AG, Switzerland

[21] Appl. No.: 736,685

[22] Filed: Jul. 26, 1991

[30] Foreign Application Priority Data

Jul. 27, 1990 [DE] Fed. Rep. of Germany ....... 4023910

[51] Int. Cl.$^5$ .............................................. C08J 11/26
[52] U.S. Cl. ................... 521/43.5; 528/485; 528/486; 528/487; 528/488
[58] Field of Search ............ 521/40.5, 40, 43.5; 523/313, 348; 528/485, 486, 487, 488

[56] References Cited

U.S. PATENT DOCUMENTS

| | | | |
|---|---|---|---|
| 4,025,489 | 5/1977 | Bailey et al. | 528/199 |
| 4,358,550 | 11/1982 | Jacono et al. | 523/348 |
| 4,366,272 | 12/1982 | Kawamura et al. | 523/335 |
| 4,799,954 | 1/1989 | Hochberg | 521/40 |
| 4,870,148 | 12/1989 | Belz et al. | 526/318.41 |

FOREIGN PATENT DOCUMENTS

| | | |
|---|---|---|
| 0314156 | 5/1989 | European Pat. Off. . |
| 0316676 | 5/1989 | European Pat. Off. . |
| 0320757 | 6/1989 | European Pat. Off. . |
| 3405055 | 8/1984 | Fed. Rep. of Germany . |
| 3335954 | 4/1985 | Fed. Rep. of Germany . |
| 3435468 | 4/1986 | Fed. Rep. of Germany . |
| 3738786 | 5/1989 | Fed. Rep. of Germany . |
| 3742472 | 6/1989 | Fed. Rep. of Germany . |
| 0586258 | 3/1977 | Switzerland . |
| 0966020 | 10/1982 | U.S.S.R. . |
| 1503103 | 3/1978 | United Kingdom . |

*Primary Examiner*—Joseph L. Schofer
*Assistant Examiner*—Tom Weber
*Attorney, Agent, or Firm*—Quarles & Brady

[57] ABSTRACT

Process for the recovery of polymers by dissolving in an aqueous alkaline or acid medium and precipitating in a strong, turbulent, aqueous flow with subsequent ripening of the precipitated particles in a laminar flow.

18 Claims, 2 Drawing Sheets

PROCESS FOR THE RECOVERY OF POLYMERS DISSOLVABLE IN AQUEOUS ALKALINE OR ACID MEDIA

DESCRIPTION

The invention relates to a process for the recovery of polymers dissolvable in aqueous alkaline or acid media by dissolving the polymers and precipitating with acid or alkaline precipitation reagents. To avoid waste, protect the environment and recover reusable materials it has already been proposed to produce from plastics packing materials, food containers, eating utensils, such as party utensils, levels particularly for application to bottles and bottle crates, said plastics being water-resistant or insoluble in the case of neutral pH-values and under use conditions differing from the neutral pH-value, but which are soluble in the opposite pH-range. Thus, DE-OS 37 38 786 describes labels made from polymers dissolvable in an aqueous alkaline medium. DE-OS 34 35 468 and DE-OS 33 35 954 describe the production and further use of similar polymers. DE-OS 37 42 472 describes the production and use of plastics having alkaline groups, which are dissolvable in an aqueous acid medium and which are made reprecipitatable by adding alkali.

In the hitherto known precipitation processes, which are performed in conventional reaction vessels, such as mixing tanks or flasks, in general precipitation products are obtained in a compact sponge or cake-like form. It is difficult to work up these amorphous products, e.g. by pressing. They cannot be granulated in a satisfactory manner without pretreatment.

The problem of the invention is to permit the reprocessing or remanufacture of dissolved polymers to easily processable, particularly granular products.

This problem is solved by precipitating the polymers from their solutions in a strong aqueous flow followed by ripening the precipitated particles in such a way that they are substantially separate.

The polymer solutions are prepared in bases or acids particularly by dissolving plastic waste, particularly that mixed with insoluble products or other plastics and are optionally separated, particularly centrifuged from solid admixtures.

As a result of a rapid, intermittent mixing of the polymer solution and the precipitation reagent in a turbulent flow a plurality of polymer particles is formed. As a function of the type of mixing means, mixing can take place within 0.1 to 2 seconds. By rapidly converting the turbulent flow into a preferably laminar ripening flow, it is ensured that there is no increase in the size of the particles through their growing together. By separate ripening of the particles, it is ensured that the particles pass in substantially unhindered form from their original tacky state into a no longer tacky ripened state, so that they can be further processed without any agglomeration risk. An additional advantage of the invention is that it is possible to work without any addition of adjuvants, particularly surface-active substances, phosphorus-containing surfactants or emulsifiers and without adding solvents. Nevertheless adequately processable coagulates are obtained, which are free from additional admixtures, which improves their reusability and environmentally friendly characteristics. The rapid turbulent mixing preferably takes place within 0.1 to 2 sec., preference being given to a mixing time of 0.8 to 1 sec. The Reynolds number of the turbulence is preferably above 2000. In order to achieve a rapid mixing, the precipitation reagent is preferably added in the form of a liquid or solution. The ratio of the volume flows of polymer solution to precipitation reagent is not critical and is preferably 6–8:1, particularly approximately 7:1. Precipitation can take place at normal temperature, preference being given to a range of 20° to 25° C. Turbulent mixing preferably takes place with the aid of a pump in which the polymer solution and precipitation reagent are brought together. However, it is also possible to separately pressurize the volume flows of the polymer solution and the precipitation reagent and to bring them and mix them together under pressure relief, e.g. using a static mixer. The mixing pump can e.g. be a high pressure centrifugal pump.

As stated, ripening is preferably carried out with a laminar, aqueous flow, in order to avoid as far as possible any reciprocal contact between the particles and therefore any coalescing. In order to obtain a laminar flow it is possible to provide stabilizing and deflecting means, as well as cross-sectional enlargements. In order to maintain the laminar flow it is preferable to provide flow tubes, particularly those having an internal cross-section of 4 to 9, preferably 5.5 to 8 cm$^2$. The reaction tubes and other deflecting means are preferably made from a material having poor adhesion characteristics with respect to the freshly precipitated polymers, in order to prevent caking or adhesion. Polyethylene and polystyrene are suitable for this. The length of the flow tubes is dependent on the flow rate and the ripening time. A ripening time of 2 to 4, particularly 2.5 to 3 min. is generally adequate. The flow rates of the laminar flow are preferably $5\times 10^{-5}$ to $10^{-2}$ m/s, particularly $5\times 10^{-4}$ to $5\times 10^{-3}$ m/s. It is possible to have several substantially parallel tubes. It is also possible and preferred for the tubes to have a helical configuration, so as to keep the overall constructional dimensions small. The longitudinal axis of the tubes or helixes is preferably substantially vertical, which also helps to avoid any deposition or adhesion of the polymers on the walls. The Reynolds number of the laminar flow is under 1000 and preferably under 100. Particularly good results are obtained with values of 0.5 to 10.

It has been found that the polymers can be precipitated particularly favourably if the concentration of the polymer solution prior to combining with the precipitation reagent is 0.5 to 15, preferably 3 to 5% by weight. Divergences from this are possible as a function of the type of polymer to be precipitated. The process conditions can be matched to one another through the different process parameters, particularly the degree of turbulence and the form of the following laminar flow in such a way that the precipitated particles, after ripening, have a particle size or cross-section of 1 to 100 mm$^2$. It is readily possible to achieve a flow rate or throughput of 2000 to 4000 l/h, normally approximately 3000 l/h per pump or pumping mechanism, the flow rate being essentially dependent on the pump performance characteristics.

Following ripening, the precipitated polymer particles are separated from the liquid medium preferably and in particular completely in pressureless manner. For this purpose it is appropriate to use a screen, particularly an arcuate or curved screen, in which a plurality of plates are placed upon one another, accompanied by the formation of an arcuately downwardly directed screen surface, the filtrate can pass between the plates and the particles slide downwards along the arcuate surface, whilst being increasingly drained or dewatered. The pressureless separation avoids the particles sticking to one another. The particles obtained can still have a moisture or water content of 50 to 80% by weight. As a result of further draining and in particular through careful squeezing the particles can be further dried to a water content of below 50% by weight. In this form the polymer particles are suitable for further processing in an extruder and for further draining purposes the extruder used is preferably equipped with degassing means.

As a result of their finely divided, but non-tacky form, the polymer particles are suitable for direct charging of the extruder. When the particles melt in the extruder the water escapes in vaporous form, so that the polymer melt is discharged with the desired cross-sectional shape at the end of the extruder. It is also possible to mix the polymers in the extruder with admixtures, particularly pigments, stabilizers, etc. in the conventional manner, to the extent that this is desired or required. Generally the polymer melt is discharged from the extruder in the form of strands and is then pelletized. This permits an intermediate storage or, if desired, a mixing with other pellets or granular materials.

The nature of the precipitation reagent is on the one hand dependent on the nature of the polymer to be precipitated and on the other on the desired process. In order to precipitate the polymers containing acid groups and in particular carboxyl groups, it is possible to use inorganic acids, organic acids and/or acid-reacting salts. The pH-value during precipitation is normally below 6, particularly between 2 and 3. Suitable inorganic acids are mineral acids, particularly sulphuric or phosphoric acid. A particularly suitable acid-reacting salt is aluminium sulphate which, apart from bringing about a pH-shift, has the characteristic of being a coagulation aid. Acid aluminium salts are preferred if it is desirable for hydrous aluminium oxide to remain in the precipitated polymer. The filtrate solution can at least partly be recycled and reused and possibly excess-enriched sulphate or phosphate ions can be removed every so often by precipitation.

Suitable precipitation reagents are also relatively strong organic carboxylic acids, particularly biodegradable carboxylic acids such as lactic, malic, tartaric and in particular citric acid. These organic acids can in simple manner undergo biological decomposition and in particular fermentation, so that they can be disposed of in an environmentally friendly manner. These organic acids are particularly preferred if the solution of the polymer undergoes bacterial decomposition to remove carried over impurities prior to its precipitation. In this case the filtrate of the polymer precipitation can be returned to the inlet side of the bacterial decomposition and used for adjusting the conditions of the biological fermentation and also as a nutrient substrate for the bacteria.

Suitable polymers with acid groups, particularly carboxyl groups are in particular copolymers of neutral vinyl monomers with $\alpha, \beta$-unsaturated monocarboxylic and/or dicarboxylic acids and/or carboxylic acid anhydrides. The carboxylic acids can in particular be acrylic, methacrylic, crotonic, itaconic and maleic acid. Suitable vinyl monomers are alkyl acrylates and alkyl methacrylates, preference being given to those with 1 to 8 and in particular 1 to 6 carbon atoms in the alcohol component, as well as styrene. Preferred acids are acrylic and methacrylic acid. The polymers can also be in the form of terpolymers, the termonomer preferably being a neutral vinyl monomer, which differs from the other neutral monomer. Such polymers are known and are e.g. described in the aforementioned DE-OS 33 35 954, DE-OS 34 35 468 and DE-OS 37 38 786. As a function of the hydrophobic character of the neutral monomer, the carboxyl group content is preferably adjusted in such a way that the polymers are insoluble in the neutral and acid medium and are soluble in the alkaline medium above pH 8 to 9 and are reprecipitatable by acidification.

Polymers which are insoluble in the neutral and basic medium, but soluble in the acid medium cover copolymers of styrene with acrylates, as well as copolymers of styrene with methacrylates or termonomers of the styrene/acrylate/acrylate type, or the styrene/methacrylate/acrylate type, or the styrene/methacrylate/methacrylate type, which have basic groups and in particular amino groups. These preferably include copolymers of the aforementioned neutral vinyl monomers with dialkylaminoalkyl acrylates or methacrylates, such as are e.g. described in DE-OS 37 42 472. These polymers can also be present in terpolymer form. Unlike in the case of the aforementioned polymers, these polymers can be dissolved by adding acids and can be reprecipitated from the acid solutions by alkaline-acting precipitation reagents. Otherwise the process can be performed in the same way as described hereinbefore.

Further features of the invention can be gathered from the following description of preferred embodiments in conjunction with the drawings and subclaims. The individual features can be realized individually or in the form of combinations in an embodiment. In the drawings show:

FIG. 1 a process diagram for performing the inventive process according an embodiment, starting from contaminated plastic waste and ending with purified plastic.

Figure 2:
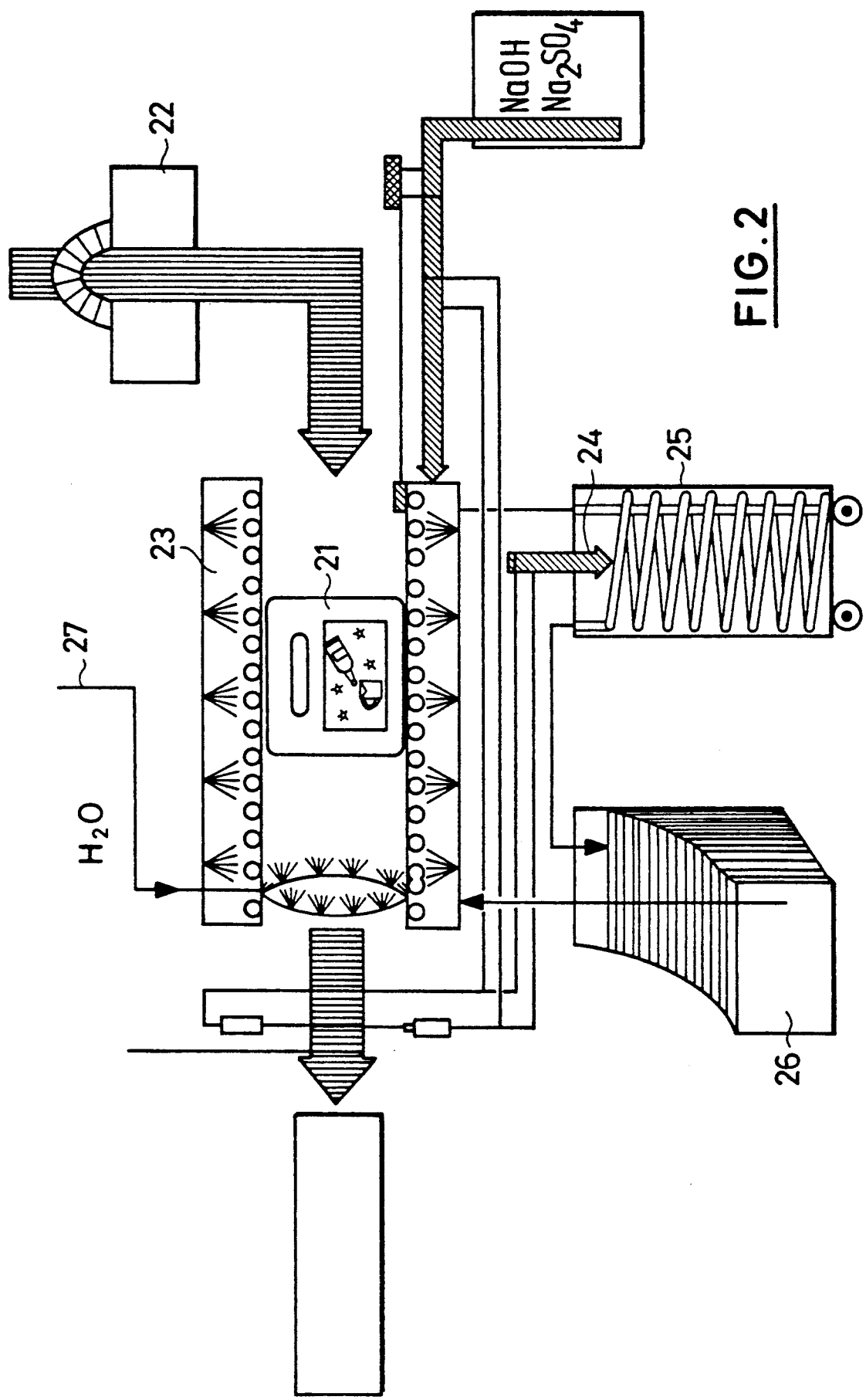

FIG. 2 a process diagram for performing another embodiment of the invention.

The process illustrated by FIG. 1 will be explained by means of an embodiment.

600 kg of refuse or garbage from a fast food restaurant containing approximately 60 kg of used plastic utensils (plates, cups, knives, forks, spoons, etc.), as well as 540 kg of food residues, together with other biological and organic substances such as paper, paper napkins, cigarette packets, cigarette butts, matches, etc. are coarsely comminuted in a shredder not shown in the drawing and are then passed at 1a into a pulper 1, to which is simultaneously supplied aqueous caustic soda solution at 1b and which, based on the refuse quantity, contains 25 kg of NaOH. As a result of the high shear forces in the pulper during dissolving there is simultaneously a mechanical crushing or comminution, so that a suspension leaves the pulper 1 through a pipe 2 which contains the dissolved plastics, dissolved organic components and finely divided, undissolved refuse. This suspension undergoes a solid/liquid separation in a decanting centrifuge 3, the separated solids are collected in a container 4 and can be used for composting or other purposes. The aqueous alkaline polymer solution having a pH-value of 11 to approximately 13 can, if desired, partly be returned through pipe 5a for the concentrating of the polymer material in the pulper 1. Normally it is passed through the pipe 5 into a buffer container 6, which has a multiple function. It firstly serves to permit a substantially continuous outflow through pipe 7 of the solution to undergo the following bacterial decomposition, even if the refuse is supplied in discontinuous manner to the pulper 1. The buffer container also adjust the pH-value and temperature to values suitable for bacterial decomposition. For this purpose the temperature is set to approximately 50° C., so that for the bacterial decomposition taking place endothermically at 35° to 40° C. there is still an adequate heat quantity for compensating the energy balance. The pH-value of the aqueous alkaline solution is reduced to 8.5 to 10.5 in the buffer container 6, so that there is a favourable pH-value of approximately 8.5 for anaerobic fermentation in the methane reactor 8. This adjustment in the methane reactor takes place on the basis of a further pH-reduction by neutralizing the alkali present due to $CO_2$ formation. Working under anaerobic conditions takes place in the methane reactor 8. The latter is partly filled with packings or fillers, preference being given to zeolite granules. To these packings adhere bacterial cultures, which are preferably adapted to the fermentable organic constituents of the polymer solution. This can be achieved by initiating anaerobic fermentation by using sewage sludge, which contains a plurality of different bacterial strains, whereof propagation preferably takes place of those strains which can process the fermentable organic constituents. The methane formed during anaerobic fermentation can be drawn off at the upper end of the methane reactor and supplied for further use, e.g. for heating the pulper. The methane reactor 8 is preferably thermostatically controllable and in particular heatable, so that, if necessary, suitable temperature adjustments can be made. Through pipe 9 a purified polymer solution leaves the methane reactor and, apart from the alkali metal salt, particularly sodium salt, the polymer substantially only contains sodium carbonate or sodium hydrogen carbonate. The originally carried biological impurities or which are dissolved by hydrolysis have been substantially completely removed by the anaerobic fermentation. If desired, in the vicinity of pipe 9 sterilization of the purified polymer solution can take place, so as to prevent the carrying over of bacteria. It is also possible at this point to carry out a decolourization of the solution using per se known decolourizers. If necessary, there can be an additional solid/liquid separation, e.g. by centrifuging at this point. The purified polymer solution then passes into a precipitation chamber 10, where it is mixed with the precipitation reagent supplied at 10a. In this preferred embodiment the precipitation reagent is preferably an organic acid biodegradable in the methane reactor, preference being given to citric acid as a relatively strong acid. The precipitation in the precipitation chamber 10 takes place under turbulent conditions under which the plastic solution from pipe 9 and the acid from pipe 10a are intimately mixed together within a short time, preferably 0.1 to 2 sec. The volume flow of polymer solution to the volume flow of precipitation reagent are preferably in a ratio of 6:1 to 8:1. During acidification carbon dioxide escapes at 10b and this can be supplied for reuse, e.g. for partial neutralization in the buffer container 6. Substantially directly following turbulent mixing the aqueous polymer suspension, which preferably has a pH-value of 2 to 6.5, is brought into a laminar flow, so as to permit ripening of the finely divided polymer particles and during which they change from an original tacky state into a solid, no longer tacky state, without being in reciprocal contact. A ripening time of 2 to 4 min. is generally adequate for this. The laminar flow is obtained by stabilizing the turbulent flow; particularly by a marked cross-sectional widening and can be continued in one or more, optionally parallel-connected reaction or ripening tubes, which are preferably constructed helically to save space. The tubes are preferably arranged in such a way that the axis of the tubes or coils is substantially vertical. The laminar flow rate is preferably $5 \times 10^{-5}$ to $10^{-2}$ m/s and in particular $5 \times 10^{-4}$ to $5 \times 10^{-3}$ m/s. The Reynolds number of the laminar flow is below 1000, preferably below 100 and particular preference is given to ranges of 0.5 to 10.

Following the laminar ripening the polymer particles are separated from the saline solution of the precipitation acid, which preferably takes place in pressureless manner, in order to avoid caking of the polymer particles. Solid/liquid separation preferably takes place with the aid of a screen or filter, preference being given to an arcuate screen. The polymers are then obtained in the form of discrete, still highly aqueous (50 to 80% by weight water) polymer particles, which can e.g. be further drained by careful squeezing. The polymer particles are sufficiently pure to enable them to be further processed without any further working up. They are particularly suitable for further processing in an extruder with a degassing device, because they are present in a size suitable for charging an extruder. The residual water quantities are removed through the degassing devices of the extruder.

The filtrate draining out of the arcuate screen 12 through pipe 13 is at least partly returned to the buffer container 6, where it is used for cooling and adjusting the pH of the aqueous alkaline polymer solution, whilst excess filtrate can be drained off.

FIG. 2 describes the procedure with respect to a washing plant for objects provided with removable labels, e.g. beer bottle crates.

Beer crates generally carry an inscription showing the brewery which has produced the beer. According to DE-OS 37 38 786, the beer crates are given a label, which is made entirely from plastics dissolvable in alkaline aqueous medium. If the beer crates are very dirty and/or are to be given a new label, they are cleaned in a washing plant and the old label is removed. For this purpose an automatic washing plant is provided, which can clean 3000 beer crates per hour using 600 l/h of water. The emptied beer crates 21 are initially passed through a diagrammatically represented prewashing mechanism 22, where they are sprayed with a thixotropic sodium hydroxide-containing cleaning agent, after which they pass into a washing plant 23, where the partly dissolved dirt and the detached labels are rinsed off. The alkaline washing water containing the dissolved polymer of the labels collected in the washing plant 23 is mixed in a not shown high pressure centrifugal pump, accompanied by turbulent mixing with precipitation reagent $Al_2(SO_4)_3$, sulphuric acid and/or phosphoric acid, the polymer particles being obtained in finely divided form. The suspension formed is then transferred into a laminar flow and is passed in this form through a helical flow tube 25 until the separately flowing polymer particles have solidified to such an extent that they no longer stick together. After ripening has taken place the polymer suspension is passed over an arcuate screen 26, the liquid phase being obtained as a filtrate, whilst the solid phase slides along the arcuate screen surface and can then be removed.

The pulverulent or granular polymer material can be worked up in the manner described hereinbefore and reused. The filtrate can be returned as a washing liquid until the sulphate content has enriched to such an extent that a conventional precipitation is performed, e.g. in the form of gypsum or hydrous aluminium oxide.

The process can be performed in an energy and material saving manner, the water consumption being low at approximately 200 g of fresh water per beer crate, which is supplied for rewashing at 27.

The process can be used in a similar way for other objects, which are inscribed with labels made from alkali-soluble polymers and in particular also for beer bottles. It is also possible to build up the layers to be detached or dissolved in multilayer form from different polymers, which have a graded alkali solubility. In the case of a multistage performance of the dissolving process, a fractionated dissolving of the individual layers with detergents having stepped-increasing pH-values is possible. If the wash solutions are separately collected, a separate recovery and processing of the different polymers is possible.

I claim:

1. A process for the recovery of polymers dissolvable in at least one of the group consisting of aqueous alkaline and acid media, comprising the steps of dissolving the polymers and precipitating with acid or alkaline precipitation reagents, the precipitation being carried out in a strong aqueous flow and the precipitated particles ripening substantially separate from one another.

2. The process according to claim 1, wherein said precipitation is performed under rapid, turbulent mixing.

3. The process according to claim 2, wherein the turbulent mixing is carried out with the aid of a pump.

4. The process according to claim 1, wherein said ripening is performed with a laminar flow.

5. The process according to claim 1, wherein the ripening time is between about 2 to 4 minutes.

6. The process according to claim 1, wherein the ripening is carried out with a laminar flow in at least one selected from the group consisting of a reaction tube, an arrangement of parallel tubes, or in at least one helical tube.

7. The process according to claim 6, wherein the conversion of the turbulent flow into a laminar flow is brought about by at least one selected from the group consisting of a cross-sectional widening and a deflecting means.

8. The process according to claim 2, wherein the turbulence and the following ripening are so matched to one another that the precipitated particles, after ripening, are obtained with a cross-section of 1 to 100 mm$^2$.

9. The process according to claim 1, wherein the precipitated particles are separated from the liquid medium without the application of pressure.

10. The process according to claim 1, wherein the precipitated particles are separated from the liquid medium with the aid of a screen having an arcuate screen surface.

11. The process according to claim 1, wherein the precipitated particles are separated in the form of particles having a water content of between about 50 to 80% by weight.

12. The process according to claim 1, wherein the separated particles are predried by squeezing to a water content of less than about 50%.

13. The process according to claim 9, wherein the separated particles preferably having a water content of less than about 50% by weight are fed into an extruder, and are processed to a substantially anhydrous product.

14. The process according to claim 9, wherein the precipitated particles are processed to pellets or granules with the aid of an extruder.

15. The process according to claim 3, wherein said pump is a centrifugal pump.

16. The process according to claim 5, wherein said ripening time is between about 2.5 to 3 minutes.

17. The process according to claim 9, wherein the precipitated particles are separated without the application of pressure from the liquid medium.

18. The process according to claim 13, wherein said extruder includes a degassing device.

* * * * *